United States Patent [19]

Kuroda et al.

[11] Patent Number: 4,775,505

[45] Date of Patent: Oct. 4, 1988

[54] PROCESS FOR PREPARING A WATER REPELLENT CALCIUM SILICATE SHAPED PRODUCT

[75] Inventors: Katsuhiko Kuroda; Toru Tagawa, both of Yokohama; Hiroo Katayama, Machida, all of Japan

[73] Assignee: Mitsubishi Chemical Industries Limited, Tokyo, Japan

[21] Appl. No.: 36,458

[22] Filed: Apr. 9, 1987

[30] Foreign Application Priority Data

Apr. 23, 1986 [JP] Japan ................... 61-93672

[51] Int. Cl.$^4$ ............................................. B28B 1/26
[52] U.S. Cl. ..................... 264/82; 106/119; 106/120; 264/86
[58] Field of Search ............. 106/85, 90, 96, 119, 106/120; 264/82, 86, 87

[56] References Cited

U.S. PATENT DOCUMENTS

| | | | |
|---|---|---|---|
| 3,936,311 | 2/1976 | Kirst et al. | 106/119 |
| 4,129,447 | 12/1978 | Roth et al. | 106/119 |
| 4,193,958 | 3/1980 | Uchida et al. | 264/86 |
| 4,490,320 | 12/1984 | Oguri et al. | 264/82 |
| 4,659,386 | 4/1987 | Nagai et al. | 106/120 |

FOREIGN PATENT DOCUMENTS

| | | | |
|---|---|---|---|
| 627239 | 7/1963 | Belgium | 106/120 |
| 51-68669 | 6/1976 | Japan | 106/119 |
| 57-123851 | 5/1982 | Japan . | |
| 59-232954 | 12/1984 | Japan | 106/120 |
| 7302045 | 8/1973 | Netherlands | 106/120 |

*Primary Examiner*—Peter Hruskoci
*Attorney, Agent, or Firm*—Oblon, Fisher, Spivak, McClelland & Maier

[57] ABSTRACT

A process for preparing a water repellent calcium silicate shaped product, which comprises dispersing a siliceous source and a calcareous source in water, mixing a water repellent composition thereto, reacting the mixture under heating to obtain an aqueous slurry containing a calcium silicate hydrate, pressfilter-molding the aqueous slurry, followed by drying or drying after steam-curing.

5 Claims, No Drawings

PROCESS FOR PREPARING A WATER REPELLENT CALCIUM SILICATE SHAPED PRODUCT

The present invention relates to a process for preparing a calcium silicate shaped product having excellent water repellency. More particularly, it relates to a process for preparing a calcium silicate shaped product having a low bulk density and excellent flame and heat resistance, mechanical strength and dimensional stability and having uniform water-repellency throughout the interior of the product, which is thus suitable as a flame and heat resistant material, a heat insulator and a lagging material.

In general, the calcium silicate shaped product to be used as a flame and heat resistant material, a heat insulator or a lagging material, is required to have a low thermal conductivity. In recent years, a product having a low bulk density and high strength has been produced.

However, the reduction of the weight of the product brings about a substantial increase of the porosity, i.e. an increase of possible water absorption. Once water is absorbed, the thermal conductivity increases remarkably, whereby the function as a heat insulator or a lagging material substantially deteriorates.

Therefore, various attempts have been made to obtain a calcium silicate shaped product having water repellency. For example, there have been proposed a method wherein a water repellent agent containing an alkali metal methyl siliconate is coated by a brush on the surface of the calcium silicate shaped product, followed by drying, and a method wherein an emulsion obtained by emulsifying a certain silicone compound with an anionic surfactant, is added to an aqueous slurry of calcium silicate during the preparation of a calcium silicate shaped product (Japanese Unexamined Patent Publication No. 123851/1982).

However, no adequate water repellency has been obtained even if such conventional methods have been applied particularly to a calcium silicate shaped product having a low bulk density. Further, when the surface is treated with a water repellent agent, it will be necessary to apply and dry the water repellent agent afresh on a fresh surface produced by cutting or milling e.g. to adjust the size at the application site, such being extremely inconvenient, since the operation is time consuming and cumbersome.

The present inventors have conducted extensive research for a method of imparting water repellency to the interior of the shaped product, and as a result, have found a process for producing a calcium silicate shaped product having a very high water repellency.

Thus, the present invention provides a process for preparing a water repellent calcium silicate shaped product, which comprises dispersing a siliceous source and a calcareous source in water, mixing a water repellent composition thereto, reacting the mixture under heating to obtain an aqueous slurry containing a calcium silicate hydrate, pressfilter-molding the aqueous slurry, followed by drying or drying after steam-curing.

Now, the present invention will be described in detail with reference to the preferred embodiments.

As the siliceous source to be used in the present invention, there may be mentioned natural sources such as diatomaceous earth and ground quartzite; silicon dust; and industrial by-products such as ground quartzite obtained by reacting aluminum hydroxide with hydrosilicofluoric acid formed as a by-product in a wet process for producing phosphoric acid (hereinafter referred to as a by-product ground quartzite of wet phosphoric acid process). These siliceous sources may be amorphous or crystalline. However amorphous sources such as diatomaceous earth, a by-product ground quartzite of wet phosphoric acid process and silicon dust are preferred, since it is thereby possible to readily produce a calcium silicate hydrate having a wet volume of at least 15 $cm^3/g$ as will be described hereinafter.

As the calcareous source, there may be employed conventional sources such as calcium oxide, calcium hydroxide and carbide waste.

The molar ratio of the calcareous source to the siliceous source ($CaO/SiO_2$) is usually selected within a range of from 0.7 to 1.2. These two sources are dispersed in water in an amount of at least 15 times by weight based on the solid source components to obtain a starting material slurry.

As the water repellent composition to be added to this starting material slurry, there may be mentioned (a) an emulsion obtained by emulsifying a silicone oil with a surfactant, and (b) a composition which comprises a silicone oil and a substantially non-volatile paraffinic compound or low molecular weight hydrocarbon resin, wherein the separation index of the paraffinic compound or low molecular weight hydrocarbon resin to the silicone oil is at most 0.4.

As the silicone oil constituting the water repellent composition, various conventional materials may be employed. For example, dimethylpolysiloxane and its derivatives or modified products may be mentioned. The dimethylpolysiloxane and its derivatives may usually have a viscosity of from 0.5 to 10 centistokes, preferably from $10^2$ to $10^8$ centistokes at 25° C.

As specific examples, there may be mentioned SH-200 (tradename, dimethylpolysiloxane, manufactured by Toray Silicone Co., Ltd.), KF-54 (tradename, methylphenylpolysiloxane manufactured by Shinetsu Chemical Industries Co., Ltd.), KF-99 (tradename, methylhydrodienepolysiloxane, manufactured by Shinetsu Chemical Industries Co., Ltd.), SF-8418 (tradename, methylcarboxypolysiloxane, manufactured by Toray Silicone Co., Ltd.), a modified diemthylpolysiloxane having OH groups at both terminals, and aminomethyl polysiloxane. Further, as the silicone oil to be used in combination with the substantially non-volatile paraffinic compound or low molecular weight hydrocarbon resin, it is preferred to employ a linear polymer of dimethylpolysiloxane or its modified product, which is liquid at a temperature of from 0° to 40° C.

The surfactant used for emulsifying the silicone oil may be any one of anionic, cationic and nonionic surfactants.

As the anionic surfactant, there may be employed one having an anionic group optionally selected from the group consisting of a carboxylate represented by the formula —COOM, a sulfonate represented by the formula —$SO_3M$, a sulfate represented by the formula —$OSO_3M$ and a phosphate represented by the formula

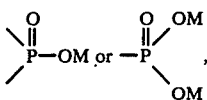

wherein M is K, Na, NH₄ or triethanol amine. Specifically, there may be mentioned, for example, Emal (tradename, sodium alkylsulfonate, manufactured by Kao K.K.), Diplodine K-25 (tradename, potassium dehydroabietate, manufactured by Toho Kagaku Kogyo K.K.), Pelex OTP (tradename, sodium dialkylsulfosuccinate, manufactured by Kao Atlas K.K) Neopelex F-25 (tradename, sodium dodecylbenzenesulfonate, manufactured by Kao Atlas K.K.), Pelex NB (tradename, sodium alkylnaphthalenesulfonate, manufactured by Kao Atlas K.K.), Demol NL (tradename, sodium naphthalenesulfonate-formalin condensation product, manufactured by Kao Atlas K.K.), Levenol WX (tradename, polyoxyethylene alkyl ether sodium sulfate, manufactured by Kao Atlas K.K.), Levenol WZ (tradename, polyoxyethylene alkylphenyl ether sodium sulfate, manufactured by Kao Atlas K.K.), Electrostripper K (tradename, polyoxyethylene dialkyl ether potassium phosphate, manufactured by Kao Atlas K.K.), Demol EP (tradename, sodium polyacrylate, manufactured by Kao Atlas K.K.), and NIKKOL SMD-10 (tradename, sodium salt of a styrene-maleic acid copolymer, manufactured by Nikko Chemicals K.K.).

As the cationic surfactant, an organic or inorganic salt of a primary to tertiary amine represented by the formula:

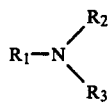

wherein $R_1$ is an alkyl group which may contain a substituent or an allyl group, and each of $R_2$ and $R_3$ is a hydrogen atom or an alkyl group, or a polyoxyethylene alkyl amine may be mentioned. Specifically, a salt such as an acetate or a hydrochloride of e.g. stearylamine, laurylamine, octylamine, tetradecylamine, stearylaminopropylamine, distearylamine, dimethyloctylamine, dimethyldecylamine, dimethyllaurylamine, an imide product of an olefin-maleic anhydride copolymer or adduct with dimethylaminopropylamine, or an imide product of a styrene-maleic anhydride copolymer with dimethylaminopropylamine, may be mentioned.

The non-ionic surfactant includes an ethylene glycol condensation product of a sorbitan dialkyl ester, sorbitan trialkyl ester or sorbitan alkyl ester, a fatty acid-polyethylene glycol condensation product, an aliphatic amide-polyethylene glycol condensation product, an aliphatic amine-polyethylene glycol condensation product, an aliphatic alcohol-polyethylene glycol condensation product, an alkyl phenyl-polyethylene glycol condensation product, and a polypropylene glycol-polyethylene glycol condensation product.

As the substantially non-volatile paraffinic compound, a solid paraffinic compound, for example, paraffin wax made from petroleum (melting point: 115°–190° F.), bees wax, carnauba wax, polyethylene wax; or a fraction separated from a petroleum and refined, and composed essentially of paraffinic compounds, a lubricant oil such as a turbine oil or a machine oil containing such a fraction or a liquid paraffin, which is liquid at a temperature of from 0° to 40° C., may be mentioned. As the substantially non-volatile low molecular weight hydrocarbon resin, a polybutene, a polybutadiene, an epoxidized polybutadiene, a low molecular weight polymer of an α-olefin having from 16 to 18 carbon atoms, a petroleum resin, or a coumarone-indene resin, which usually has a molecular weight of up to 5000 and which is liquid at a temperature of from 0° to 40° C., may be mentioned. Here, "substantially non-volatile" means that when the water repellent composition of the present invention is applied to an object, the paraffinic compound or low molecular weight hydrocarbon resin in the composition will remain without evaporation for a long period of time.

Among the water repellent compositions to be used in the process of the present invention, the above-mentioned emulsion (a) can readily be prepared by mixing from 0.1 to 30 parts by weight, preferably from 1 to 15 parts by weight, of the above-mentioned surfactant to 100 parts by weight of the above-mentioned silicone oil in a usual manner, followed by emulsification by means of an emulsifying device such as a homomixer, a homogenizer, a colloid mill or a supersonic emulsifying apparatus.

Further, the above-mentioned emulsion (a) may also be obtained by subjecting a cyclic siloxane monomer such as {(CH₃)₂SiO}₃ or {(CH₃)₂SiO}₄ to emulsion polymerization with the above-mentioned cationic surfactant in the presence of an acidic catalyst such as dodecyl benzene sulfonic acid.

Further, commercially available emulsions of dimethylpolysiloxane or its derivatives, such as SH-490, SM-8701 and SM-7060 (tradenames, anion emulsions of dimethylpolysiloxane, manufactured by Toray Silicone Co., Ltd.) and SM-8706 (tradename, an anion emulsion comprising dimethylpolysiloxane with both terminal OH groups modified, manufactured by Toray Silicone Co., Ltd.) may also be advantageously used.

In the case of the water repellent composition (b), the paraffinic compound and low molecular weight hydrocarbon resin are required to have a separation index of at most 0.4 to the silicone oil. If the separation index of the paraffinic compound and low molecular hydrocarbon resin exceeds 0.4, the water repellency will be inadequate. In such a case, a compatibilizing agent is added to bring the separation index to a level of at most 0.4.

Specific examples of such a compatibilizing agent include a surfactant having a HLB of from 0 to 6 such as a sorbitan dialkylester, a sorbitan trialkylester, an alkylphenol-polyethylene glycol condensation product, a fatty acid-polyethylene glycol condensation product, an aliphatic alcohol-polyethylene glycol condensation product, an aliphatic amide-polyethylene glycol condensation product or a polypropylene glycol-polyethylene glycol condensation product; a perfluoroalcohol-polypropylene glycol-isocyanate adduct; a monohydric alcohol ester of a fatty acid; a polyhydric alcohol monoester of a fatty acid; a polyhydric alcohol diester of a fatty acid; a copolymer of an α-olefin having from 6 to 52 carbon atoms with a maleic acid monoester or maleic acid diester; or a modified ethylene-vinyl acetate copolymer, which improves the compatibility of the silicone oil with the paraffinic compound or low molecular weight hydrocarbon resin.

The control of the separation index of the paraffinic compound and low molecular weight hydrocarbon resin can conveniently be conducted by adding the above-mentioned compatibilizing agent to the mixture comprising a silicone oil and the paraffinic compound and/or low molecular weight hydrocarbon resin. In such a case, the amount of the compatibilizing agent is suitably selected within a range of from 0.1 to 50% by weight relative to the above-mentioned mixture.

In the present invention, the separation index is a value obtained by introducing 25 g of a mixture obtained by mixing the silicone oil and the above-mentioned variable paraffinic compound or low molecular weight hydrocarbon resin in the weight ratio of 3:2 or such a mixture with an addition of a compatibilizing agent in the above-mentioned range, into a 50 ml beaker, and stirring it with a Teflon stirring element (length: 20 mm, diameter: 6-8 mm) by a magnetic stirrer at 1200 rpm for 5 minutes, then transferring the liquid mixture to a test tube having a diameter of about 17 mm, and leaving it to stand still at a temperature of from 15° to 30° C. for 60 minutes, whereupon the height of the transparent layer formed is divided by the total height of the liquid to obtain a value as the separation index. When the solid paraffinic compound is used, the measurement of the separation index is conducted under a temperature higher than the melting point of said paraffinic compound.

Accordingly, in the case where a water repellent composition contains a compatibilizing agent, its separation index is obtained by conducting the above-mentioned measurement by using as a test sample a composition obtained by adding to a composition comprising the silicone oil and the paraffinic compound or low molecular weight hydrocarbon resin in the weight ratio of 3:2, a compatibilizing agent in an amount to bring its ratio relative to the paraffinic compound or low molecular weight hydrocarbon resin to the above-mentioned ratio of the compatibilizing agent to the paraffinic compound or low molecular weight hydrocarbon resin in the water repellent composition.

In the water repellent composition (b), the mixing ratio of the silicone oil and the paraffinic compound or low molecular weight hydrocarbon resin is preferably within a range of from 70:30 to 10:90 by weight ratio. Particularly preferred is a range of from 60:40 to 20:80. If the silicone oil is less than the above ratio, the water repellency will be inadequate, and if it exceeds the above ratio, the cost of the water repellent composition tends to be expensive, such being undesirable.

For the water repellent composition (b), the above-mentioned silicone oil and the paraffinic compound or low molecular weight hydrocarbon resin, if necessary, together with a compatibilizing agent, are dispersed and mixed in accordance with a conventional method by e.g. a turbine vane stirrer or a homomixer, or dissolved in an organic solvent such as toluene or benzene, to obtain a water repellent composition. When the solid paraffinic compound is used, the preparation of the repellent composition is carried out under a temperature higher than the melting point of said solid paraffinic compound.

Further, the water repellent composition (b) may be used in the form of an emulsion by emulsifying it with an addition of water and, if necessary, together with a surfactant, or paraffin oxide, ester wax or a salt thereof. To obtain such an emulsion, the three components i.e. the silicone oil, the paraffinic compound or low molecular weight hydrocarbon resin and water may simultanesouly be mixed. If a compatibilizing agent is employed in such a case, it is advantageous from the viewpoint of the formation of an emulsion that the compatibilizing agent is preliminarily incorporated to the silicone oil or to the paraffinic compound or low molecular weight hydrocarbon resin. The amount of the surfactant used for emulsifying the water repellent composition (b) is preferably the minimum amount required for emulsifying the mixture comprising the silicone oil and the paraffinic oil or low molecular weight hydrocarbon resin to water. Usually, it is added in an amount of from 2 to 30% by weight, preferably from 2 to 20% by weight, relative to the mixture which may contain a compatibilizing agent as the case requires. For the emulsification of the above composition, conventional methods such as a homomixer, a colloid mill, a valve homogenizer and the ultrasonic waves, may be employed.

Further, for the purpose of increasing the viscosity of this emulsion or improving the stability, water-soluble polymer compounds, for example, synthetic polymers such as a polyvinyl alcohol, a polyethylene imine, a polyacrylic acid, a styrene-maleic anhydride copolymer or their salts; cellulose derivatives such as methyl cellulose, carboxymethyl cellulose or hydroxymethyl cellulose, may be added. Such a water-soluble polymer compound is used usually in an amount of from 0.01 to 10% by weight, preferably from 0.01 to 6% by weight relative to the mixture of the silicone oil, the paraffinic compound or low molecular weight hydrocarbon resin, and optionally the compatibilizing agent. If the amount of the addition is less than 0.01 weight %, no adequate improvement in the stability can be expected. On the other hand, if the amount exceeds 10% by weight, an adverse effect to the water repellency may be brought about, such being undesirable.

In the process of the present invention, the above water repellent composition is added to the starting material slurry obtained by dispersing the siliceous source and the calcareous source in water. The amount of the water repellent composition relative to the starting material slurry affects the water repellency of the resulting shaped product. If the amount is too much, the resistance such as the fire proofing property, the flame resistance or the heat resistance tends to decrease because of the organic content (the hydrocarbon group) contained in the water repellent composition. Therefore, the water repellent composition is used usually in an amount of at most 20% by weight, preferably from 1 to 15% by weight, based on the solid content (nonvolatile content) in the water repellent composition per the weight of the shaped product. The mixture of the starting material slurry and the water repellent composition, thus obtained, is then subjected to a hydrothermal reaction at a temperature of from 80° to 230° C. for 30 minutes to 10 hours in accordance with a conventional manner, whereby an aqueous slurry containing a calcium silicate hydrate is obtainable.

Calcium silicate hydrates are generally classified in accordance with the classification described in The Chemistry of Cements (edited by H. F. W. Taylor), Vol. I, page 182, Table II. In the present invention, the calcium silicate hydrate may be any tobermorite group compound selected from the group consisting of tobermorite gel, C—S—H (II), C—S—H (I) and crystalline tobermorite, or xonotlite.

In the present invention, it is preferred that the calcium silicate hydrate in the aqueous slurry has a wet volume of at least 15 cm$^3$/g.

The wet volume here is meant for a value calculated by the following equation (I):

$$\text{Wet volume} = V/W \quad (I)$$

wherein W is a total weight of the starting materials (i.e. the calcareous source and the siliceous source) and V is a volume of solid components precipitated by sedimentation of the aqueous slurry for 24 hours after the reaction. In practice, the wet volume is obtained as follows. Firstly, $W_1$ g of the aqueous slurry is sampled from a total weight of $W_0$ g of the slurry obtained by the reaction and put into a measuring cylinder, and it is kept to stand still for 24 hours, whereupon the volume $V_1$ of the precipitated solid components was measured. Then, the wet volume is calculated by the following equation (II):

$$\text{Wet volume} = \frac{V_1}{W_1 \times \frac{W}{W_0}} \quad (II)$$

where W is a total weight of the starting materials as defined above.

In order to obtain a wet volume of at least 15 cm$^3$/g, the reaction is carried out, for instance, at a temperature of at least 130° C., preferably from 150° to 230° C., more preferably from 160° to 210° C., under stirring. It is necessary to maintain the reaction system in a liquid state, and therefore, the reaction is usually carried out under higher pressure.

The aqueous slurry containing the calcium silicate hydrate thus obtained, is subjected to pressfilter-molding after an addition of a reinforcing fiber. The reinforcing fiber may, of course, be incorporated preliminarily prior to the preparation of the slurry. For this operation, the temperature and pressure are usually within ranges from 30° to 80° C. and from 1 to 200 kg/cm$^2$G, respectively. The adjustment of the bulk density of the shaped product can be done by adjusting the piston stroke of the press molding machine. As the reinforcing fiber, there may be used various types of conventional fibers such as asbestos, rock wool, glass fiber, and pulp. The reinforcing fiber is incorporated usually in an amount such that it constitutes from 0.5 to 10% by weight in the final shaped product.

Then, the shaped product thus prepared is subjected to drying or steam curing under pressure i.e. so-called autoclave curing in a conventional manner. By this steam curing, the calcium silicate hydrate will be transformed into crystalline tobermorite or xonotlite in the case of tobermorite gel, C—S—H (I) or C—S—H (II), or will be transformed into xonotlite in the case of crystalline tobermorite. By this transformation of the crystals by means of the steam curing, it is possible to obtain a shaped product having a low bulk density and excellent mechanical strength. In general, the higher the steam pressure is, the shorter the reaction time can be made, but it is usually within a range of from 5 to 50 kg/cm$^2$G. The steam pressure is preferably from 12 to 40 kg/cm$^2$G in the case where xonotlite is desired as the crystals of the final shaped product. Likewise, the steam pressure is preferably from 6 to 30 kg/cm$^2$G when crystalline tobermorite is desired as the crystals of the final product. Under such conditions, the above-mentioned transformation can usually readily be conducted. If the transformation does not proceeds as desired (such being extremely rare) e.g. if crystalline tobermorite is obtained when xonotlite is desired, the problem can readily be solved by increasing the steam pressure, or by prolonging the operation time of the steam curing. Likewise, if xonotlite is obtained when crystalline tobermorite is desired, the problem can readily be solved by decreasing the steam pressure, or by shortening the operation time of the steam curing. For applications where high resistance is required, it is preferred to transform the crystals into xonotlite.

After the steam curing, the shaped product is subjected to drying treatment to obtain a desired calcium silicate shaped product. In the case of a shaped product obtained by pressfilter-molding an aqueous slurry containing xonotlite, the drying treatment can be conducted immediately without the above steam curing.

Thus, it is possible to obtain a calcium silicate shaped product having a low bulk density and excellent flame and heat resistance, mechanical strength and dimensional stability, and having water repellency uniformly imparted throughout the interior of the product.

Now, the present invention will be described in further detail with reference to Examples and Comparative Examples. However, it should be understood that the present invention is by no means restricted by these specific Examples. In these Examples, "parts" means "parts by weight".

EXAMPLE 1

Warm water was added to 43.2 parts of quick lime (CaO: 98%) for slaking, and 46.8 parts of ground quartzite (SiO$_2$: 97%, Al$_2$O$_3$: 1.2%, Fe$_2$O$_3$: 0.09%) was added thereto. Then, water was added to bring the total amount of water to be 30 times by weight relative to the solid components, to obtain a staring material slurry. To this starting material slurry, an emulsion obtained by emulsifying 90 parts of SH-200 (tradename, dimethylpolysiloxane, 500 cst, manufactured by Toray Silicone Co., Ltd.) with 1 part of Pelex OCT (tradename, sodium dialkylsulfosuccinate, manufactured by Kao Atlas K.K.) by means of a homomixer, was added in a predetermined amount.

The suspension thus obtained was stirred and reacted in an autoclave for 2.5 hours at 200° C. under a pressure of 15 kg/cm$^2$B, whereby an aqueous slurry comprising a tobermorite group compound having a wet volume of 23 cm$^3$/g was obtained.

To this slurry, 3 parts of an alkali resistant glass fiber was added and mixed, and the amount of the slurry was adjusted to bring the bulk density of the shaped product to be 0.10 g/cm$^3$, followed by pressfilter-molding.

The shaped product thus obtained was charged into an autoclave, steam-cured for 7 hours at 180° C. under a steam pressure of 10 kg/cm$^2$G, and then dried at 105° C. for 24 hours to obtain a shaped product having a thickness of 30 mm.

EXAMPLE 2

231 parts (1 mol) of α-olefins having from 16 to 18 carbon atoms (tradename: Dialen 168, manufactured by Mitsubishi Chemical Industries Limited) and 189 parts (1.1 mol) of diethyl maleate were charged into a 1 liter four necked flask, and heated to 160° C. under a nitrogen atmosphere. Then, to this mixture, 9.66 parts (0.066 mol) of di-tert-butylperoxide was added in portions of ⅓ in an interval of 20 minutes under stirring. After the addition, the reaction was conducted for further 1 hour at the same temperature.

After the completion of the reaction, light boiling components and unreacted monomers contained in the reaction mixture were distilled off under a reduced pressure of from 1 to 3 mmHg to obtain an α-olefin ($C_{16}$–$C_{18}$)-diethyl maleate copolymer (hereinafter referred to as PAR 168 Et).

4 parts of PAR 168 Et thus obtained and 40 parts of a turbine oil (Diamond Turbine Oil #68) and 60 parts of the silicone oil (SH-200, 500 cst) were mixed and dispersed by a homomixer to obtain an oily composition.

The separation index of the turbine oil was adjusted to 0.11 by the addition of PAR 168 Et. To this mixture, 2 parts of a propylene oxide-ethylene oxide copolymer (HLB: 11.6) as an emulsifier and 109 parts of deionized water were added, and the mixture was emulsified by a homomixer to obtain an emulsion having a solid content of 49.3%.

A shaped product was prepared in the same manner as in Example 1 except that the above emulsion was used instead of the emulsion of dimethylpolysiloxane in Example 1.

COMPARATIVE EXAMPLE 1

Warm water was added to 43.2 parts of quick lime (CaO: 98%) for slaking, and 46.8 parts of ground quartzite ($SiO_2$: 97%, $Al_2O_3$: 1.2%, $Fe_2O_3$: 0.09%) was added thereto. Then, water was added to bring the total amount of water to be 30 times by weight relative to the solid components. The starting slurry thus obtained was stirred and reacted in an autoclave for 2.5 hours at 200° C. under a pressure of 15 kg/cm²G, whereby an aqueous slurry comprising a tobermorite group compound having a wet volume of 23 cm³/g was obtained. To this aqueous slurry, the emulsion used in Example 1 was added in a predetermined amount, and the subsequent operation was conducted in the same manner as in Example 1 to obtain shaped products.

The bulk densities of such shaped products were within a range of 0.10±0.02 g/cm³, and the flexural strength was within a range of 5±1.5 kg/cm².

TEST EXAMPLE 1

The shaped products obtained in Examples 1 and 2 and Comparative Example 1 were immersed in water at 20° C. so that the respective upper surfaces were located at 2 cm below the water surface, and the water absorbance after 24 hours was calculated in accordance with the following equation and shown in Table 1.

$$\text{Water absorbance (\%)} = \frac{\text{Weight after immersion(g)} - \text{Weight before immersion(g)}}{\text{Volume of the test piece (cm}^3\text{)}} \times 100$$

The water absorbance of the shaped products obtained in Examples 1 and 2 shows remarkably high water resistance as compared with the product obtained in the Comparative Example 1.

TABLE 1

| Amount of the water repellent composition (parts) | Water absorbance (%) | | |
|---|---|---|---|
| | Example 1 | Example 2 | Comparative Example 1 |
| 5 | 3.4 | 2.4 | 8.6 |
| 4 | 3.6 | 3.2 | 14.6 |

The process of the present invention is effective to impart extremely high water repellency to a calcium silicate shaped product.

We claim:

1. A process for preparing a water repellent calcium silicate shaped product, which comprises dispersing a siliceous source and a calcareous source in a molar ratio of calcareous source to siliceous source of from 0.7 to 1.2 in water in an amount of at least 15 times by weight based on the calcareous source and siliceous source, mixing from 1-20 wt.% of a water repellent composition comprising silicone oil thereto based on the solid content in the water repellent composition per weight of the shaped product, reacting the mixture under heating at from 80° to 230° C. to obtain an aqueous slurry containing a calcium silicate hydrate, pressfilter-molding the aqueous slurry, followed by drying or drying after steam-curing wherein the steam pressure during said steam-curing is within a range of from 5-50 kg/cm²G.

2. The process according to claim 1, wherein the water repellent composition is an emulsion obtained by emulsifying a silicone oil with a surfactant.

3. The process according to claim 1, wherein the water repellent composition comprises a silicone oil and a substantially non-volatile paraffinic compound or hydrocarbon resin which has a molecular weight of up to 5000, wherein the separation index of the paraffinic compound or hydrocarbon resin to the silicone oil is at most 0.4.

4. The process according to claim 3, wherein the water repellent composition contains a surfactant compatibilizing agent which is capable of reducing the separation index of the substantially non-volatile paraffinic compound or hydrocarbon resin to the silicone oil to a level of at most 0.4.

5. The process accoridng to claim 1, wherein the water repellent composition is an aqueous emulsion.

* * * * *